US011566787B2

(12) United States Patent
Graves et al.

(10) Patent No.: US 11,566,787 B2
(45) Date of Patent: Jan. 31, 2023

(54) TILE ATTACHMENT SCHEME FOR COUNTER SWIRL DOUBLET

(71) Applicant: Rolls-Royce Corporation, Indianapolis, IN (US)

(72) Inventors: Charles B. Graves, Katy, TX (US); David E. B. Stone, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 188 days.

(21) Appl. No.: 16/841,297

(22) Filed: Apr. 6, 2020

(65) Prior Publication Data

US 2021/0310655 A1 Oct. 7, 2021

(51) Int. Cl.
F23R 3/00 (2006.01)
F23R 3/04 (2006.01)
F23M 5/00 (2006.01)

(52) U.S. Cl.
CPC .............. F23M 5/00 (2013.01); F23R 3/002 (2013.01); F23R 3/045 (2013.01); F23M 2900/05003 (2013.01)

(58) Field of Classification Search
CPC .......... F23M 5/00; F23M 2900/05003; F23R 3/002; F23R 3/04; F23R 3/045; F23R 3/12; F23R 2900/03041; F23R 2900/03042

See application file for complete search history.

(56) References Cited

U.S. PATENT DOCUMENTS

| | | | |
|---|---|---|---|
| 4,301,657 A * | 11/1981 | Penny | F23R 3/12 60/750 |
| 4,302,941 A | 12/1981 | DuBell | |
| 5,488,829 A * | 2/1996 | Southall | F23R 3/12 60/725 |
| 6,170,266 B1 * | 1/2001 | Pidcock | F23R 3/08 60/755 |
| 6,351,949 B1 * | 3/2002 | Rice | F23R 3/007 60/752 |
| 9,328,665 B2 * | 5/2016 | Doerr | F23R 3/60 |
| 9,341,372 B2 * | 5/2016 | Penz | F23R 3/06 |
| 9,765,969 B2 | 9/2017 | Graves | |
| 2003/0177769 A1 * | 9/2003 | Graves | F23R 3/50 60/804 |
| 2010/0024427 A1 * | 2/2010 | Graves | F23R 3/06 29/889.2 |
| 2012/0297778 A1 * | 11/2012 | Rudrapatna | F23R 3/045 60/755 |
| 2015/0040576 A1 * | 2/2015 | Graves | F23R 3/28 60/776 |
| 2015/0285498 A1 * | 10/2015 | Cunha | F23R 3/50 29/592 |

(Continued)

*Primary Examiner* — Arun Goyal
*Assistant Examiner* — Henry Ng
(74) *Attorney, Agent, or Firm* — Crowell & Moring LLP

(57) ABSTRACT

A cartridge for attachment to the inner surface of a single-walled combustion liner of an annular combustor is provided. The cartridge includes at least one chute projecting into the combustion chamber for a counter swirl effect for improved fuel/air mixing in the combustion chamber and at least two studs projecting through associated stud holes in the liner. A method for attaching a cartridge to the inner surface of a single-walled combustion liner is also provided.

17 Claims, 9 Drawing Sheets

(56) References Cited

U.S. PATENT DOCUMENTS

| | | | |
|---|---|---|---|
| 2016/0169517 A1* | 6/2016 | Graves | F23R 3/60 |
| | | | 60/752 |
| 2016/0238250 A1* | 8/2016 | Moura | F23R 3/007 |
| 2017/0167730 A1* | 6/2017 | Heinze | F23R 3/06 |
| 2017/0234538 A1* | 8/2017 | Park | F23R 3/04 |
| | | | 60/751 |
| 2017/0356653 A1* | 12/2017 | Bagchi | F23R 3/002 |
| 2018/0252413 A1* | 9/2018 | Clemen | F23R 3/60 |
| 2019/0293290 A1* | 9/2019 | Heinze | F23R 3/045 |
| 2019/0368736 A1* | 12/2019 | Rudrapatna | F23R 3/045 |
| 2020/0208840 A1* | 7/2020 | Sauer | F23R 3/045 |

* cited by examiner

TILE ATTACHMENT SCHEME FOR COUNTER SWIRL DOUBLET

TECHNICAL FIELD

The present disclosure relates to a combustor for a gas turbine engine and more particularly, to a method for attaching chutes to single-walled combustion liners, via a bolt-on tile attachment cartridge, and a tile attachment cartridge for attachment to single-walled combustion liners, to improve fuel/air mixing in an annular combustor.

BACKGROUND

Gas turbine engines may be used on vehicles such as airplanes and helicopters. These engines are internal combustion engines that operate to produce thrust by discharging a high velocity exhaust. Some gas turbine engines may also include fan blades to create thrust.

Gas turbine engines include one or more compressors, a combustor, and one or more turbines. Air is compressed in the compressor(s), mixed with fuel in the combustor and ignited, such that expanding gases are created and discharged through a turbine. The discharge gas rotates the turbine, which is typically used to turn a shaft and produce shaft work output, such as to drive the compressor or a gearbox. There may be one or more turbines and corresponding shafts producing shaft work output. Gas exhausting from the turbine may be further utilized to generate thrust. Systems within a gas turbine engine may use the shaft work output.

Some existing gas turbine engine combustors have various shortcomings, drawbacks, and disadvantages relative to certain applications. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

Figure 1:
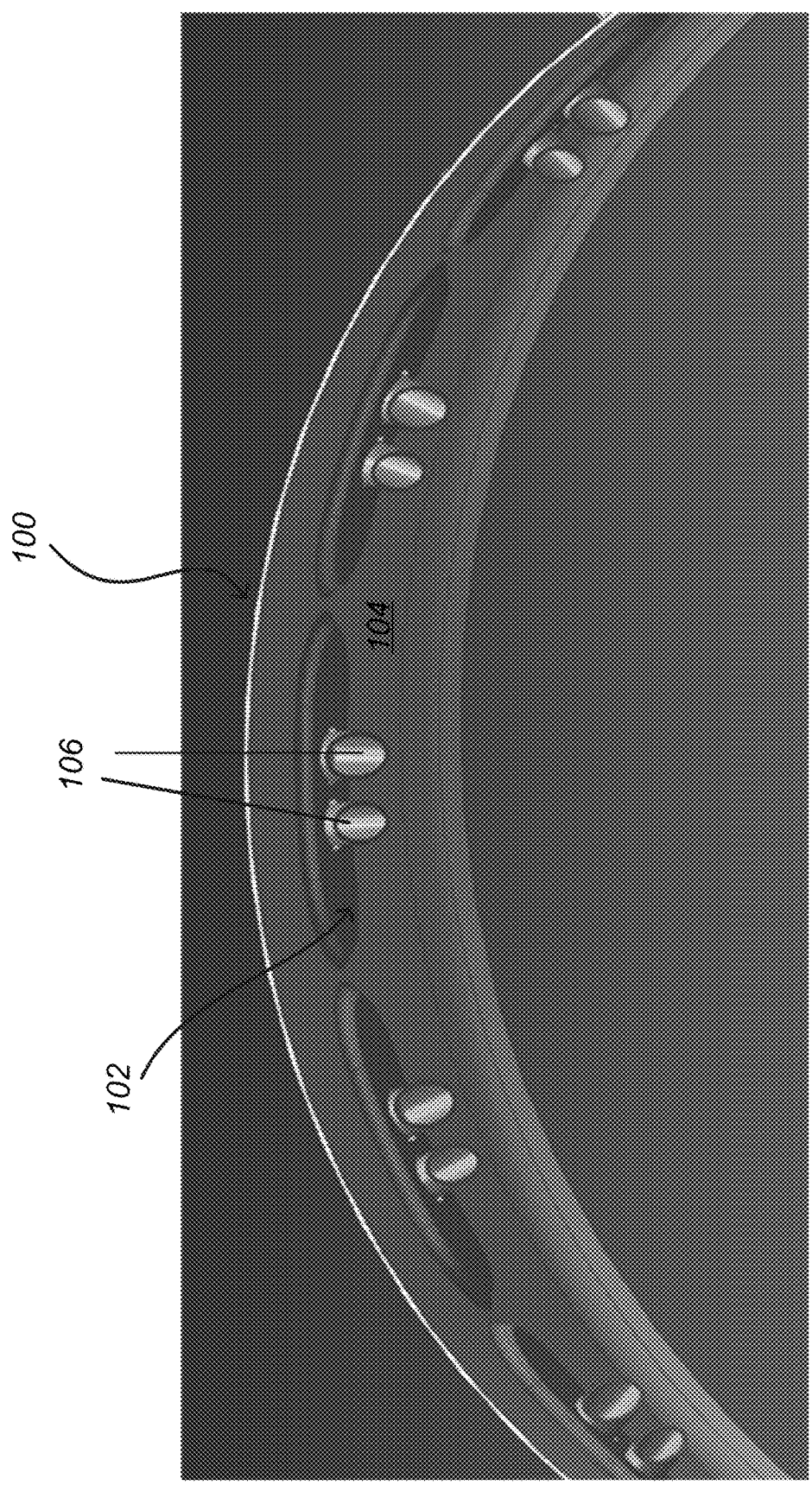
FIG. 1 illustrates a partial perspective view of an example of an outer single-walled combustion liner of an annular combustor with an example of cartridges attached to the outer single-walled combustion liner.

According to an example of the present disclosure, a cartridge includes a cartridge surface, a cartridge perimeter bordering the cartridge surface, at least one chute, each of the at least one chute(s) integral to the cartridge, and at least two studs, each of the at least two studs integral to the cartridge. The cartridge may be attached on an inner surface of a single-walled combustion liner of an annular combustor across at least one associated feed hole in the single-walled cartridge liner. The inner surface of the single-walled combustion liner may be a surface of the single-walled combustion liner that faces the inside of the annulus and which may be exposed to combustion gases. The cartridge perimeter may contact the inner surface of the single-walled combustion liner.

According to another example of the present disclosure, a cartridge includes a cartridge surface, a cartridge bevel bordering the cartridge surface, a cartridge perimeter bordering the cartridge bevel, at least one chute, each of the at least one chute(s) integral to the cartridge, and at least two studs, each of the at least two studs integral to the cartridge. The cartridge may be attached on an inner surface of a single-walled combustion liner of an annular combustor across at least one associated feed hole in the single-walled cartridge liner. The inner surface of the single-walled combustion liner may be a surface of the single-walled combustion liner that faces the inside of the annulus and may be exposed to combustion gases. The cartridge perimeter may contact the inner surface of the single-walled combustion liner. The cartridge surface may not contact the inner surface of the single-walled combustion liner such that a gap may be between the inner surface of the single walled combustion liner and the cartridge surface.

According to yet another example of the present disclosure, a method of attaching a cartridge to a combustion liner of an annular combustor of a gas turbine engine may include the steps of: providing a cartridge including a cartridge surface, a cartridge perimeter bordering the cartridge surface, at least one chute, each of the at least one chute(s) integral to the cartridge; and at least two studs, each of the at least two studs integral to the cartridge; contacting the cartridge perimeter with an inner surface of the combustion liner, wherein the inner surface may face an interior volume of the annular combustor, and wherein each of the at least two studs may extend through an associated stud hole in the combustion liner; and fastening a nut on each of the at least two studs so as to retain the cartridge in the combustion liner. The combustion liner may be a single-walled combustion liner.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Combustion temperature uniformity across the outlet of a combustion chamber is important to the efficiency and operational life of a combustor and to other components in a gas turbine engine, such as the first stage of turbine vanes, and the like. If thorough mixing is not achieved, a non-uniform temperature variation of combustion products exiting the combustor will result. This, in turn, could potentially subject downstream turbine components to localized overheating. Such overheating may affect the durability of downstream turbine parts and could potentially decrease overall turbine efficiency and longevity. As will be readily appreciated, the more thorough the mixing and combusting of fuel and air, the lower the likelihood of localized overheating due to hot spots or hot streaks in the combustion byproducts. Hot streaks or hot spots are defined as an area of increased temperature relative to the bulk gas temperature of the hot combustion gas byproducts as is known to those skilled in the art.

An annular combustor may include an annular combustion chamber formed between an inner single-walled combustion liner and an outer single-walled combustion liner coaxially disposed relative to each other to form a combustion zone. Fuel injectors or nozzles are configured to swirl the fuel and air mixture injected therefrom into the combustion zone. The inner single-walled combustion liner includes at least one primary air inlet hole circumferentially arranged in a plane or row downstream of and to a lateral side of each of the fuel nozzles. Similarly, the outer single-walled combustion liner includes at least one primary air inlet hole circumferentially arranged in a plane or row downstream of and to a lateral side of each of the fuel nozzles. The outer at least one primary air inlet hole or "outer at least one hole" and the inner at least one primary air inlet hole or "inner at least one hole" may be offset to opposing lateral sides of the fuel nozzle such that the air jets formed create an opposite swirl direction to that of the fuel swirl direction. The swirl pattern of the fuel may be clockwise or counter-clockwise while the air flow jets of the outer at least one hole and inner at least one hole are injected in the opposite direction so as to create a counter swirl for ideal mixing of the air and fuel.

Annular combustors typically employ an array of fuel nozzles located on or near a centerline of a forward bulkhead of a combustor. In general, the fuel nozzles spray fuel into the combustion chamber to mix with the air for combustion. The ideal air-to-fuel ratio is called "the stoichiometric ratio," which means the exact amount of fuel and air is supplied in order to completely combust the air and fuel without excess remaining reactants. While air swirlers at the fuel injector may be somewhat effective, the swirling motion may centrifuge hotter, less dense gases towards a centerline of a fuel nozzle, creating a temperature "bulls-eye" at the exit of the combustor. To mitigate this effect, air swirlers have been typically followed by at least two rows of primary air inlets per fuel injector or nozzle. It has been discovered that eliminating the second and any subsequent rows downstream of the first row of primary air inlets and increasing the number of inlet holes in the inner and outer combustion liners may significantly increase the uniformity of fuel/air mixing, and, therefore, provide a more uniform temperature at the combustor exit. The inlet holes may additionally advantageously include chutes on the combustion chamber side of the inner and outer combustion liners. In some gas turbine applications, it is contemplated that a benefit may occur with two or more primary air inlets positioned in one row of a circumferential plane in both the inner and outer combustion liners depending on the design configuration, pressures, and flow rates required. An additional benefit to this concept is that the combustor may be significantly shortened while still providing adequate length for complete combustion. Such annular combustors not only provide enhanced mixing of the combustion gases (fuel and air mixture) within the combustion chamber, but also achieve a reduction of peak temperatures or hot streaks at the exit plane of the combustion chamber. Thus, such annular combustors provide a more uniform temperature distribution that reduces the formation of hot streaks while advantageously cooling the inner and outer combustion liners of the combustion chamber. Annular combustors including inner and outer single-walled combustion liners may provide additional design and manufacturing benefits in some gas turbine applications. One interesting feature of annular combustors including inner and outer single-walled combustion liners may be simplicity of design and/or manufacturing. Alternatively, or in addition, an interesting feature of annular combustors including inner and outer single-walled combustion liners may be lower overall weight.

It may be contemplated that introducing an increased number of primary air inlet holes into inner and/or outer single-walled combustion liners of a combustion chamber of an annular combustor may be accomplished by brazing inserts, each including at least one primary inlet hole, in place in associated holes in the inner and outer single-walled combustion liners. Though introduction of an increased number of primary air inlet holes by brazing of inserts in place may provide successful performance, such brazing of inserts may significantly complicate manufacturing assembly of an inner and/or outer single-walled combustion liner(s) in practical and nontrivial aspects. Brazing of inserts in place in associated feed holes in inner and/or outer single-walled combustion liners may significantly complicate overall manufacturing and production of the inner and/or outer single-walled combustion liners. Alternatively, or in addition, brazing of inserts in place in associated feed holes in inner and/or outer single-walled combustion liners may be difficult to repeat in manufacturing at a constant standard. Alternatively, or in addition, brazing of inserts in place in associated holes in inner and/or outer single-walled combustion liners may be a prohibitively expensive manufacturing technique.

Further, aside from the at least one primary inlet hole in each of the inserts that would provide combustion air to the combustion chamber, each of the inserts may include one or more dilution and/or effusion cooling holes that may deliver additional air to cool the average bulk temperature of the combustion products and/or components of the single-walled combustion liners that are heated by the hot combustion gases, including, but not limited to, each of the inserts. Brazing of inserts in place in associated holes in inner and/or outer single-walled combustion liners subsequent to introduction of effusion cooling holes may lead to a phenomenon in which capillary action may cause braze material to wick into the effusion cooling holes. Alternatively, introducing effusion cooling holes into each of the inserts after brazing each of the inserts in place in associated holes in inner and/or outer single-walled combustion liners may be complicated by the increased thickness of each of the inserts, which may result in adverse cooling in the vicinity of each primary air inlet hole.

Alternatively, it may be contemplated that introducing an increased number of primary air inlet holes into inner and/or outer single-walled combustion liners of a combustion chamber of an annular combustor may be accomplished by welding inserts, each including at least one primary inlet hole, in place over associated holes from a surface of the inner and/or outer single-walled combustion liners that is radially outward relative to the combustion chamber of the annular combustor. Welding of inserts in place over associated holes in inner and/or outer single-walled combustion liners may result in integrity problems. For example, welding of inserts in place over associated holes in inner and/or outer single-walled combustion liners may result in high steady-state stress. Alternatively, or in addition, welding of inserts in place over associated holes in inner and/or outer single-walled combustion liners may result in testing failures from fatigue in a relatively small number of cycles. Alternatively, or in addition, welding of inserts in place over associated holes in inner and/or outer single-walled combustion liners may result in substantial thermal gradients causing cracking.

Still alternatively, it may be contemplated that a flow area for the introduction of air through primary air inlet holes may not depend on whether or not the primary air inlet holes include chutes on the combustion chamber side of the inner and/or outer single-walled combustion liners. However, in the absence of such chutes, the flow of air through primary air inlet holes may quickly coalesce. Alternatively, or in addition, in the absence of such chutes, the enhanced effective mixing of the combustion gases may be eliminated.

Further still alternatively, it may be contemplated that plunged primary air inlet holes may be introduced into inner and outer single-walled combustion liners so as to replace traditional chutes that are independently casted, positioned relative, and then welded to each of inner and/or outer single-walled combustion liners. However, retooling to provide a plunged primary air inlet hole design for inner and/or outer single-walled combustion liners without concomitant combustion liner cracking may be difficult and require significant development. Alternatively, or in addition, a plunged primary air inlet hole design may fail to achieve optimal mixing of the combustion gases (fuel and air mixture) within the combustion chamber. Alternatively, or in addition, a plunged primary air inlet hole design may fail to achieve optimal reduction of peak temperatures or hot streaks at the exit plane of the combustion chamber. Alternatively, or in addition, a plunged primary air inlet hole design may require expensive redesigns of other cooling aspects of the combustor or one or more of the components of the combustor and turbine.

It will be appreciated that cartridges of the present disclosure advantageously may be implemented in current annular combustor designs with minimal redesign requirements for the at least one chute of each cartridge. Further, it will be appreciated that cartridges of the present disclosure advantageously may attach to single-walled combustion liners by an effective attachment means.

Every fuel type has a known stoichiometric air/fuel ratio, corresponding to the quantity of pounds of air required to burn a pound of fuel. The stoichiometric ratio for different types of fuel varies, but for a typical hydrocarbon fuel, the air/fuel ratio may be in the range of approximately 14.7 to 1. The amount of fuel needed for a maximum power cycle point of a gas turbine engine determines how much air may need to be supplied for stoichiometric combustion. Combustors may be supplied excess air to ensure complete combustion and to cool selected areas of the combustor or to lower the average temperature of the exhaust gases, so the at least one chute of the cartridges of the present disclosure may be sized to meet multiple design requirements.

Once the required air flow rate is determined, the at least one chute of the cartridges of the present disclosure may be designed using the relationship between perimeter and cross-sectional area for each of the at least one chute(s) at a given air pressure. The at least one chute of a cartridge may have any desirable or advantageous cross-sectional shape. Circular or round, oval, elliptical, or quasi-elliptical cross-sectional shapes have been found to be advantageous geometries for the at least one chute.

The at least one chute of a cartridge may advantageously have a round cross-sectional shape. The cross-sectional area for a round chute may be calculated from $A=\pi \ast d^2/4$, and the perimeter may be calculated from $P=\pi \ast d$, wherein d corresponds to the diameter for a round chute. The perimeter may define the boundary at which mixing takes place, while the cross-sectional area may define the mass flow rate and the velocity at a given pressure. The ratio of P/A may govern the speed of the mixing for a given amount of airflow, and for a round chute the equation providing the ratio of P/A may be $P/A=4/d$. As d decreases, the quotient P/A may increase, thus a smaller group of chutes may mix out faster. This analysis may lead one of ordinary skill in the art to believe that it may be advantageous to have many very small chutes providing combustion air to the injected fuel. However, the counter-swirl concept has been found to work only if air jets are able to penetrate to the other side of the combustion chamber, i.e., to the inner or outer combustion liner, respectively. The penetration distance of an air jet may be governed by the momentum of the air jet, the momentum of the cross-flow velocities, the ratio of critical dimensions, the diameter of the air jet, and the height between the inner and outer combustion liners. When an air jet passes below a threshold diameter, it may provide insufficient momentum to fully penetrate the counter swirl and it may become ineffective at mixing the air and fuel. It has been found for annular combustor applications that two round primary air jets entering through the outer single-walled combustion liner and two round primary air jets entering through the inner single-walled combustion liner as a doublet configuration to provide a counter swirl may be effective for many applications. Accordingly, cartridges of the present disclosure may include two chutes integral to the cartridge projecting radially inward into the combustion chamber, and each of the two chutes may have a round cross-sectional shape. Alternatively, it is possible that one round primary air jet or three or more round primary air jets per from the inner single-walled combustion liner and outer single-walled combustion liner may be more effective in providing mixing and increased combustion efficiency. Accordingly, cartridges of the present disclosure may include one chute integral to the cartridge projecting radially inward into the combustion chamber, and the one chute may have a round cross-sectional shape. Alternatively, cartridges of the present disclosure may include three or more chutes integral to the cartridge projecting radially inward into the combustion chamber, and each of the three or more chutes may have a round cross-sectional shape.

Alternatively, the at least one chute of a cartridge may advantageously have an elliptical cross-sectional shape. In the case of an elliptically shaped chute, the cross-sectional area may be calculated from $A=\pi \ast (a \ast b)/4$, wherein a and b correspond to the major and minor axes of the chute, respectively. The perimeter may be approximated from the relationship $P \approx 2*\pi*sqrt((a^2+b^2)/2)$. An elliptically shaped chute may have a ratio of major axis to minor axis of 2. The major axis of an elliptically shaped chute may be in line with an engine axis. Substituting a-2b into the equations provides a governing relationship of $P/A \approx 2*sqrt(10)/b$. It may be calculated that the smaller the value of b, the faster the air and fuel mixes with the same momentum limitation as above. Accordingly, cartridges of the present disclosure may include two chutes integral to the cartridge projecting radially inward into the combustion chamber, and each of the two chutes may have an elliptical cross-sectional shape. Alternatively, cartridges of the present disclosure may include one chute integral to the cartridge projecting radially inward into the combustion chamber, and the one chute may have an elliptical cross-sectional shape. Alternatively, cartridges of the present disclosure may include three or more chutes integral to the cartridge projecting radially inward into the combustion chamber, and each of the three or more chutes may have an elliptical cross-sectional shape.

Where an inlet of a chute projects radially outward from the cartridge surface, the inlet may have a "well-rounded design." In a well-rounded design of an inlet, a radius of curvature leading into the inlet may be 20% of a minor radius of the inlet.

FIG. 1 illustrates a partial perspective view of an example of an outer single-walled combustion liner 100 of an annular combustor with an example of cartridges 102 attached to the outer single-walled combustion liner 100. The cartridges 102 are attached to the outer single-walled combustion liner 100 from an inner surface 104 of the outer single-walled combustion liner 100, relative to a combustion chamber. The inner surface 104 of the outer single-walled combustion liner 100 faces a combustion chamber of the annular combustor. Each of the cartridges 102 is attached to the outer single-walled combustion liner 100 at an associated feed hole (not shown in FIG. 1) in the outer single-walled combustion liner 100. Each of the cartridges 102 includes at least two studs (not shown in FIG. 1) integral to the cartridge projecting radially outward, relative to the combustion chamber, each of the at least two studs extending through an associated stud hole (not shown in FIG. 1) in the outer single-walled combustion liner 100. Each of the cartridges 102 is retained in the outer single-walled combustion liner 100 by at least one nut (not shown in FIG. 1) that receives each of the at least two studs. Each of the cartridges 102 includes at least one chute 106 integral to the cartridge projecting radially inward partially into a gas path of the combustion chamber from the outer single-walled combustion liner 100. As shown in the example in FIG. 1, each of the cartridges 102 may include two chutes 106, or a doublet of chutes 106. Each of the at least one chute(s) 106 may help direct combustion air in a desired direction for a desired mixing velocity. Each of the cartridges 102 may have a round, oval, elliptical, or stadium (i.e., "discorectangular," or "obround," or "racetrack") shape. Each of the cartridges 102 may be attached to the outer single-walled combustion liner 100 along a circumferential axis, an axial forward-aft axis, or along a path on an acute angle offset from the circumferential and axial forward-aft axes. As shown in the example in FIG. 1, each of the cartridges 102 may be attached to the outer single-walled combustion liner 100 along a common circumferential axis.

Figure 2:
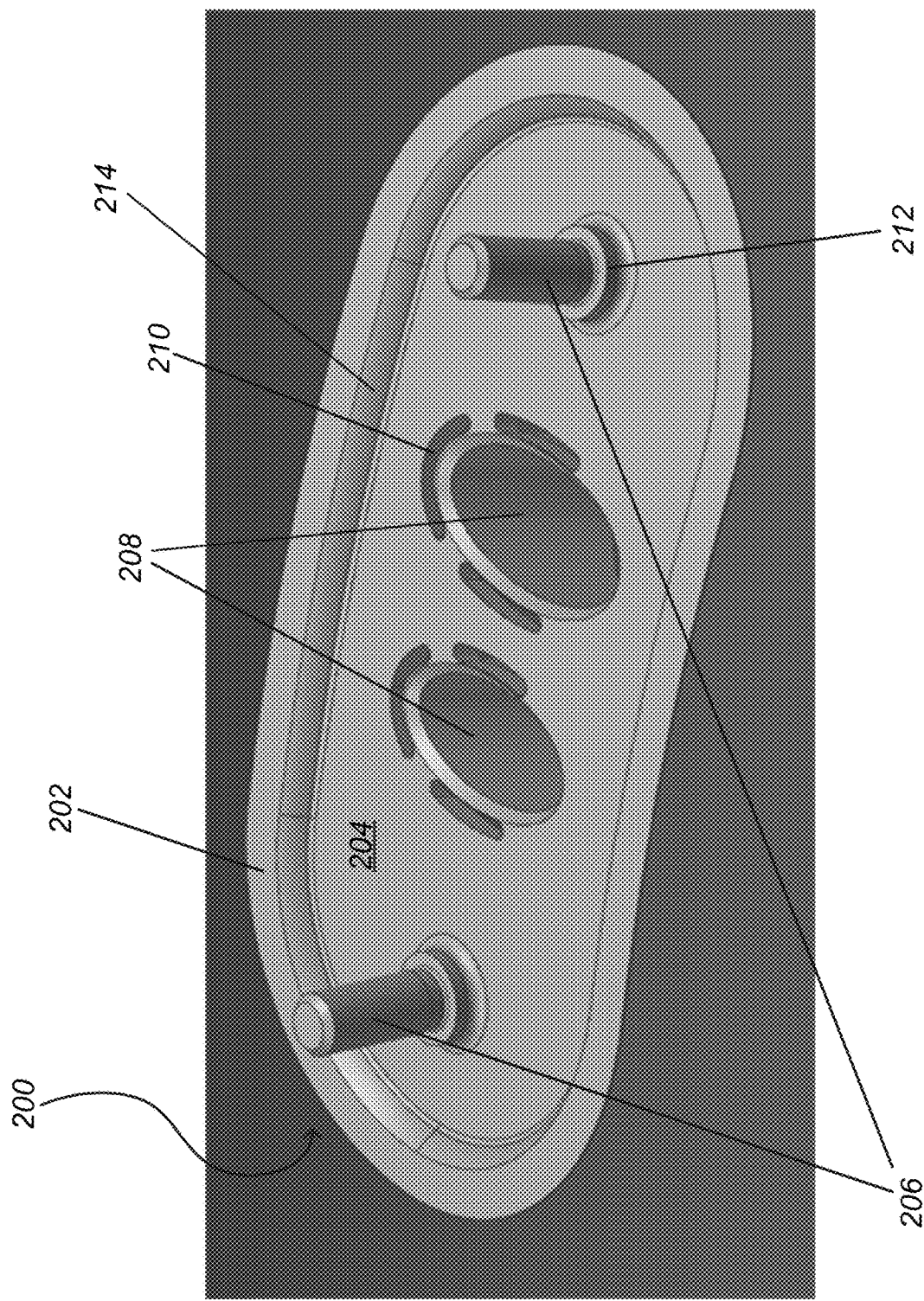
FIG. 2 illustrates a top perspective view of another example of a cartridge with bell-mouth inlet elements removed.

FIG. 2 illustrates a top perspective view of another example of a cartridge 200. A cartridge 200 includes a cartridge surface 204 bordered by a cartridge perimeter 202. A cartridge 200 may have a cartridge perimeter 202 that is round, oval, elliptical, or stadium in shape. The cartridge surface 204 may have a cartridge bevel 214 establishing a web between the cartridge surface 204 and the cartridge perimeter 202. A cartridge 200 includes at least two studs 206 integral to the cartridge 200 projecting radially outward, each of the at least two studs 206 extending through an associated stud hole in a single-walled combustion liner (not shown in FIG. 2). As shown in the example in FIG. 2, the cartridge 200 includes two studs 206. Alternatively, a cartridge 200 may include three or more studs 206, each of the three more studs 206 extending through an associated stud hole in a single-walled combustion liner (not shown in FIG. 2). One stud hole in a single-walled combustion liner may be a close-tolerance round stud hole, while a second stud hole may optionally be slotted and/or oval to provide for clearance during assembly, and thermal growth. A cartridge 200 includes at least one chute 208 integral to the cartridge 200 projecting radially inward. Each of the at least one chute(s) 208 may have any desirable or advantageous cross-sectional shape, including, but not limited to, circular or round, oval, elliptical, or quasi-elliptical. As shown in the example in FIG. 2, the at least one chute 208 of the cartridge 200 may include two chutes 208, or a doublet of chutes 208, with an elliptical or quasi-elliptical cross-sectional shape. Each of the at least one chute(s) 208 of a cartridge 200 may have identical or non-identical cross-sectional areas and perimeters. Alternatively, each of the at least one chute(s) 208 of the cartridge 200 may include one chute, two chutes, or three or more chutes. In the example shown in FIG. 2, the cartridge 200 depicts at least one chute(s) 208 in a typical flush mounted arrangement with the cartridge surface 204. Crescent-shaped ("banana") slots 210 extend through the thickness of the cartridge 200 around the periphery of each of the at least one chute(s) 208. The crescent-shaped ("banana") slots 210 may provide a protective cooling film or "air curtain" to each of the at least one chute(s) 208. The cartridge surface 204 and/or cartridge perimeter 202 and/or cartridge bevel 214 may additionally include holes (not shown in FIG. 2) in the cartridge surface 204 and/or cartridge perimeter 202 and/or cartridge bevel 214 through the thickness of the cartridge 200 to provide effusion cooling to the cartridge 200. The cartridge surface 204 and cartridge perimeter 202 and cartridge bevel 214 may be curved radially in one or more loci. As shown in the example in FIG. 2, the cartridge surface 204 and cartridge perimeter 202 and cartridge bevel 214 may be curved at each of the at least two studs 206. In profile, with the cartridge perimeter 202 contacting an inner surface of a single-walled combustion liner (not shown in FIG. 2), curvature in a cartridge surface 204 and cartridge perimeter 202 may parallel the curvature of the single-walled combustion liner. As shown in the example in FIG. 2, the cartridge surface 204 may be inset radially compared to the cartridge perimeter 202 by the cartridge bevel 214. The cartridge surface 204 may be inset radially compared to the cartridge perimeter 202 by approximately one single-walled combustion liner thickness, or, alternatively, the cartridge surface 204 may be inset radially compared to the cartridge perimeter 202 by more than one single-walled combustion liner thickness, or, alternatively, by less than one single-walled combustion liner thickness.

Each of the at least two studs 206 integral to the cartridge 200 may include a spacing feature 212 at the base of each of the at least two studs 206. The spacing feature 212 may advantageously provide a better clamp load against a suitable nut (not shown in FIG. 2) used in association with each of the at least two studs 206 to retain the cartridge 200 in the combustion liner.

Figure 3:
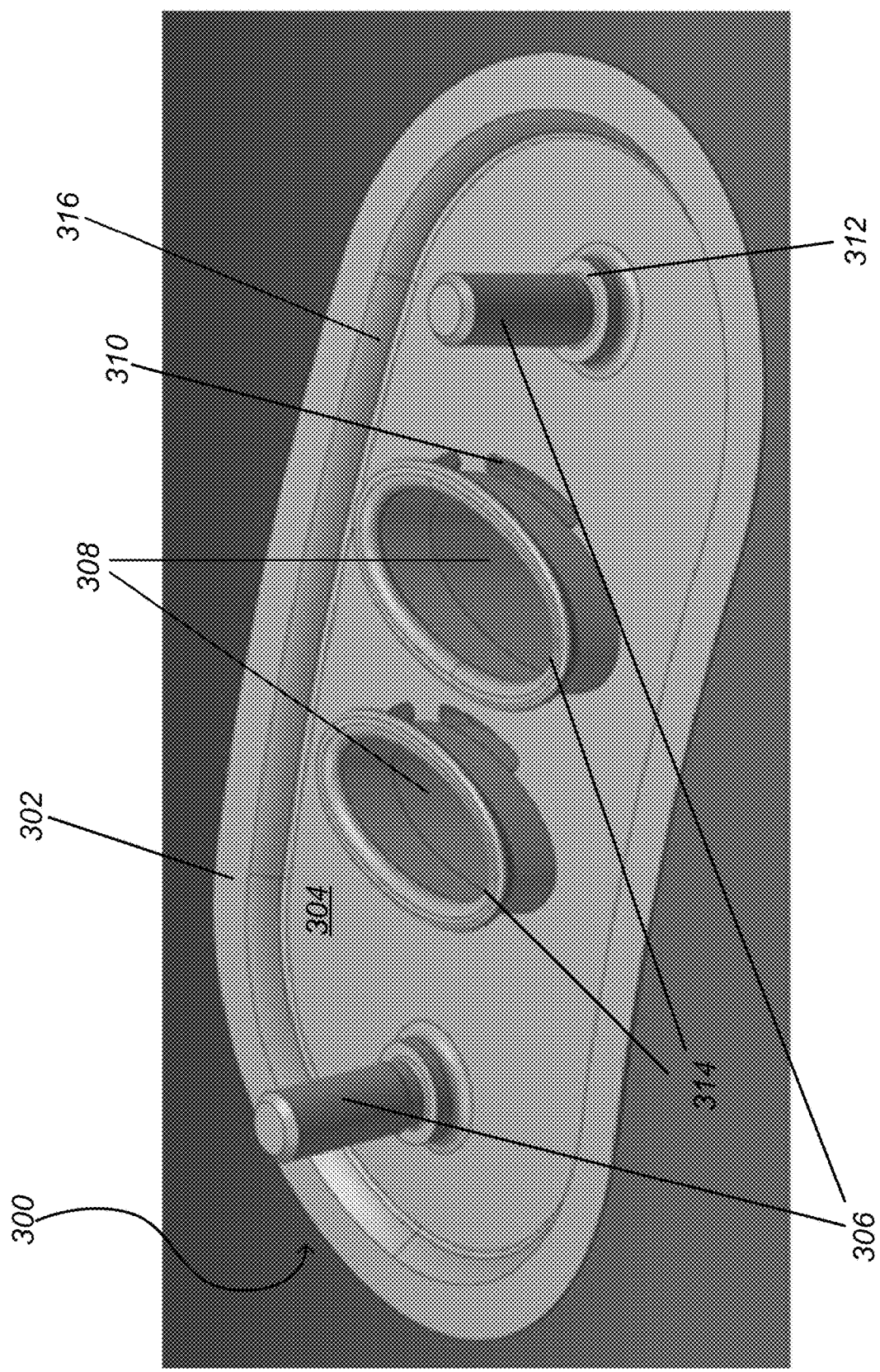
FIG. 3 illustrates a top perspective view of yet another example of a cartridge with bell-mouth inlet elements.

FIG. 3 illustrates a top perspective view of yet another example of a cartridge 300. A cartridge 300 includes a cartridge surface 304 bordered by a cartridge perimeter 302. A cartridge 300 may have a cartridge perimeter 302 that is round, oval, elliptical, or stadium in shape. The cartridge surface 304 may have a cartridge bevel 316 establishing a web between the cartridge surface 304 and the cartridge perimeter 302. A cartridge 300 includes at least two studs 306 integral to the cartridge 300 projecting radially outward, each of the at least two studs 306 extending through an associated stud hole in a single-walled combustion liner (not shown in FIG. 3). As shown in the example in FIG. 3, the cartridge 300 includes two studs 306. Alternatively, the at least two studs 306 of the cartridge 300 may include three or more studs, each extending through an associated stud hole in a single-walled combustion liner (not shown in FIG. 3). One stud hole in a single-walled combustion liner may be a close-tolerance round stud hole, while a second stud hole may optionally be slotted to provide for clearance during assembly, and thermal growth. A cartridge 300 may include at least one chute 308 integral to the cartridge 300 projecting radially inward. The at least one chute 308 may have any desirable or advantageous cross-sectional shape, including, but not limited to, circular or round, oval, elliptical, or quasi-elliptical. As shown in the example in FIG. 3, the cartridge 300 may include two at least one chute(s) 308, or a doublet of chutes 308, with an elliptical or quasi-elliptical cross-sectional shape. The at least one chute 308 of a cartridge 300 may have identical or non-identical cross-sectional areas and perimeters. Alternatively, a cartridge 300 may include one at least one chute 308, or three or more at least one chute(s) 308. As shown in the example in FIG. 3, the cartridge 300 may include at least one bell-mouth inlet(s) 314 integral to the cartridge 300 projecting radially outward from the cartridge surface 304 at each of the at least one chute(s) 308 in the same direction as each of the at least two studs 306. Each of the at least one bell-mouth inlet(s) 314 may optionally have a filleted outward terminus, or, alternatively, a chamfered outward terminus. Each of the at least one bell-mouth inlet(s) 314 may have the same perimeter as the corresponding at least one chute 308 at which the at least one bell-mouth inlet(s) 314 projects radially outward. The cartridge surface 304 may include crescent-shaped ("banana") slots 310 in the cartridge surface 304 through the thickness of the cartridge 300 around the periphery of each of the at least one chute(s) 308 and at least one bell-mouth inlet(s) 314. Each of the at least one bell-mouth inlet(s) 314 may project radially outward further than the radial inset of the cartridge surface 304 compared to the cartridge perimeter 302. Alternatively, each of the at least one bell-mouth inlet(s) 314 may project radially outward less than the radial inset of the cartridge surface 304 compared to the cartridge perimeter 302. Each of the at least two studs 306 integral to the cartridge 300 may include a spacing feature 312 at the base of each of the at least two studs 306.

Figure 4:
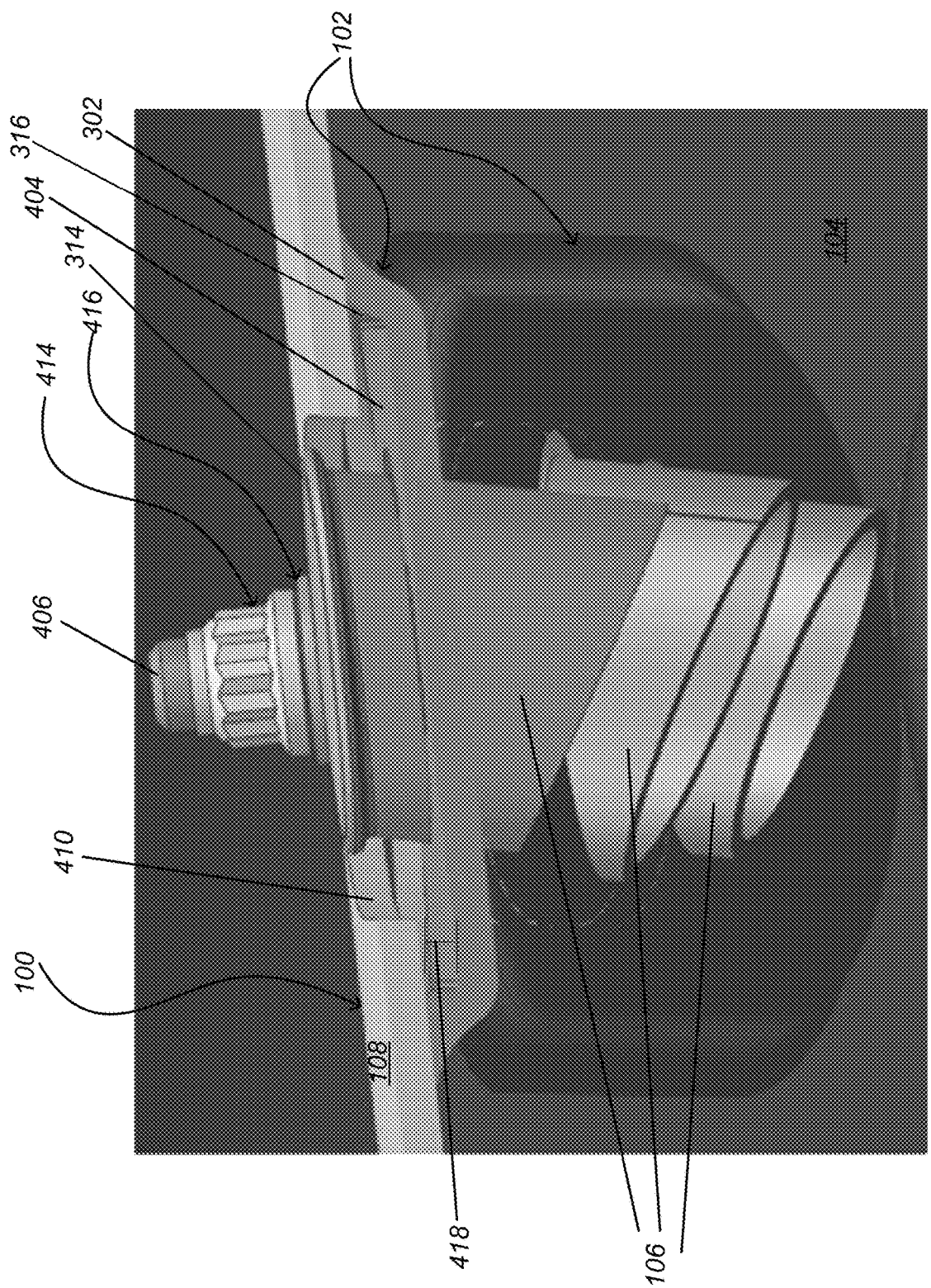
FIG. 4 illustrates a circumferential cross-sectional view of an example of an outer single-walled combustion liner with an example of cartridges attached to the outer single-walled combustion liner.

FIG. 4 illustrates a circumferential cross-sectional view of an example of the outer single-walled combustion liner 100 with an example of cartridges 102 attached to the outer single-walled combustion liner 100. Each of the cartridges 102 is attached to the outer single-walled combustion liner 100 from an inner surface 104 of the outer single-walled combustion liner 100, relative to a combustion chamber. The inner surface 104 of the outer single-walled combustion liner 100 faces the combustion chamber of the annular combustor. Each of the cartridges 102 is attached to the outer single-walled combustion liner 100 at an associated feed hole 410 in the outer single-walled combustion liner 100. The at least one bell-mouth inlet(s) 314 of each of the cartridges 102 may project radially outward from the cartridge surface 404 to a radial height outward of the outer surface 108 of the outer single-walled combustion liner 100, relative to the combustion chamber, or, alternatively, flush with the outer surface 108, relative to the combustion chamber, or, alternatively, to a radial height inward of the outer surface 108 of the outer single-walled combustion liner 100. When cartridges 102 are attached to an inner surface of an inner single-walled combustion liner (not shown in FIG. 4), the at least one bell-mouth inlet(s) 314 may project radially outward from the cartridge surface 404 to a radial height outward of an outer surface of the inner single-walled combustion liner, relative to the combustion chamber, or, alternatively, flush with the outer surface of the inner single-walled combustion liner, relative to the combustion chamber, or, alternatively, to a radial height inward of the outer surface of the inner single-walled combustion liner. The inner surface of the inner single-walled combustion liner faces the combustion chamber of the annular combustor. It will be appreciated that in the outer single-walled combustion liner 100, or an inner single-walled combustion liner (not shown in FIG. 4), an axial forward-aft physical dimension of an inner edge of an associated feed hole 410 in the outer single-walled combustion liner 100, or an inner single-walled combustion liner, may be equal to the axial forward-aft physical dimension of an inner edge of the cartridge perimeter 302 of the attached cartridge 102, while a circumferential physical dimension of the inner edge of the associated feed hole 410 in the outer single-walled combustion liner 100, or the inner single-walled combustion liner, is less than a circumferential physical dimension of the inner edge of the cartridge perimeter 302 of the attached cartridge 102. The cartridge perimeter 302 contacts the inner surface 104 of the outer single-walled combustion liner 100. When a cartridge 102 is attached to the inner surface of an inner single-walled combustion liner, the cartridge perimeter 302 may substantially contact the inner surface of the inner single-walled combustion liner. Alternatively, the axial forward-aft physical dimension of the inner edge of the associated feed hole 410 in the outer single-walled combustion liner 100, or an inner single-walled combustion liner, may be less than the axial forward-aft physical dimension of the inner edge of the cartridge perimeter of the attached cartridge 102, while the circumferential physical dimension of the inner edge of the associated feed hole 410 in the outer single-walled combustion liner 100, or the inner single-walled combustion liner, is equal to the circumferential physical dimension of the inner edge of the cartridge perimeter 302 of the attached cartridge 102. Alternatively, as shown in the example in FIG. 4, both the axial forward-aft and circumferential physical dimensions of an associated feed hole 410 in the outer single-walled combustion liner 100, or an inner single-walled combustion liner (not shown in FIG. 4), may be less than the respective axial forward-aft and circumferential physical dimensions of the cartridge perimeter 302 of the attached cartridge 102, and, accordingly, a portion of the inner surface 104 of the outer single-walled combustion liner 100, or an inner single-walled combustion liner, may be within the cartridge perimeter 302 and the cartridge bevel 316 and a portion of the outer single-walled combustion liner, or an inner single-walled combustion liner, may hang over a portion of the cartridge surface 404. The axial forward-aft and circumferential physical dimensions of an associated feed hole 410 are larger than the portion of the cartridge surface 404 including the at least one bell-mouth inlet(s) 314. Further, the axial forward-aft and circumferential physical dimensions of an associated feed holes 410 are larger than the axial forward-aft and circumferential physical dimensions of the portion of the cartridge surface 404 including the at least one chute(s) 106. The attachment of each of the cartridges 102 to the outer single-walled combustion liner 100, or an inner single-walled combustion liner, will provide a gap 418 by virtue of the radial inset of the cartridge surface 404 relative to the cartridge perimeter 302 and the extent to which the associated feed hole 410 extends over the cartridge surface 404. The gap 418 may be between the inner surface 104 of the outer single-walled combustion liner 100, or an inner single-walled combustion liner, and the cartridge surface 404 by virtue of the fact that the cartridge surface 404 may not contact the inner surface 104 of the outer single-walled combustion liner 100, or an inner single-walled combustion liner. The gap 418 may provide a source of air for effusion cooling of each of the attached cartridges 102. While not shown in FIG. 4, effusion cooling holes in the cartridge surface 404 and/or the cartridge bevel 316 may be adequately supplied by air filling the gap 418. The gap 418 may provide for different volumes of air. Effusion cooling holes in the cartridge surface 404 and/or the cartridge bevel 316 may be adequately supplied by air filling the gap 418 to result in a plenum feed pressure similar to feed pressure on the outer single-walled combustion liner 100, or an inner single-walled combustion liner. Alternatively, effusion cooling holes in the cartridge surface 404 may be adequately supplied by air filling the gap 418 if the gap 418 is at least four times the dimensions of a total area of effusion cooling holes in the portion of the cartridge surface 404 that a portion of the outer single-walled combustion liner or inner single-walled combustion liner hangs over. Without being bound by theory, it may be postulated that a principal "orifice" area may correspond to the sum of the collective area of the effusion cooling holes (not shown in FIG. 4) in the cartridge surface 404 and/or the cartridge bevel 316, which may be symbolized as "($\Sigma$ $A_c$)". A second "orifice" area may correspond to a feed area subtended by the perimeter of the associated feed holes 410 and the gap 418, which may be symbolized as "P·g". It may be desirable that the feed area not restrict the flow of air to the effusion cooling holes in the cartridge surface 404 and the cartridge bevel 316. Accordingly, it may be desirable that the second "orifice" area (i.e., the feed area) is much greater than the principal "orifice" area, or P·g>>($\Sigma A_c$), wherein the ">>" symbol may mean "much greater than". The second "orifice" area or feed area may be at least four times greater than the principal "orifice" area, or, alternatively, the second "orifice" area or feed area may be less than at least four times, but still, greater than the principal "orifice" area, or, alternatively, the second "orifice" area or feed area may be more than at least four times greater than the principal "orifice" area. To retain each of the attached cartridges 102 in the outer single-walled combustion liner 100, or an inner single-walled combustion liner, each of the at least two studs 406 of each of the cartridges 102 projects radially outward through an associated stud hole (not shown in FIG. 4) and is secured by a nut 414, such as a suitable commercially available self-locking nut. A washer 416 (shown in FIG. 4), may be sandwiched between the outer surface 108 of the outer single-walled combustion liner 100 and the nut 414. A washer 416 may be round where an associated stud hole is round, and a washer 416 may be oval where an associated stud hole is oval. Each of the cartridges 102 may be attached to the outer single-walled combustion liner 100, or an inner single-walled combustion liner, along a circumferential axis, an axial forward-aft axis, or along a path on an acute angle offset from the circumferential and axial forward-aft axes. As shown in the example in FIG. 4, each of the cartridges 102 is attached to the outer single-walled combustion liner 100 along a common circumferential axis. This same method of attachment would be used for cartridges 200 and 300.

Figure 5:
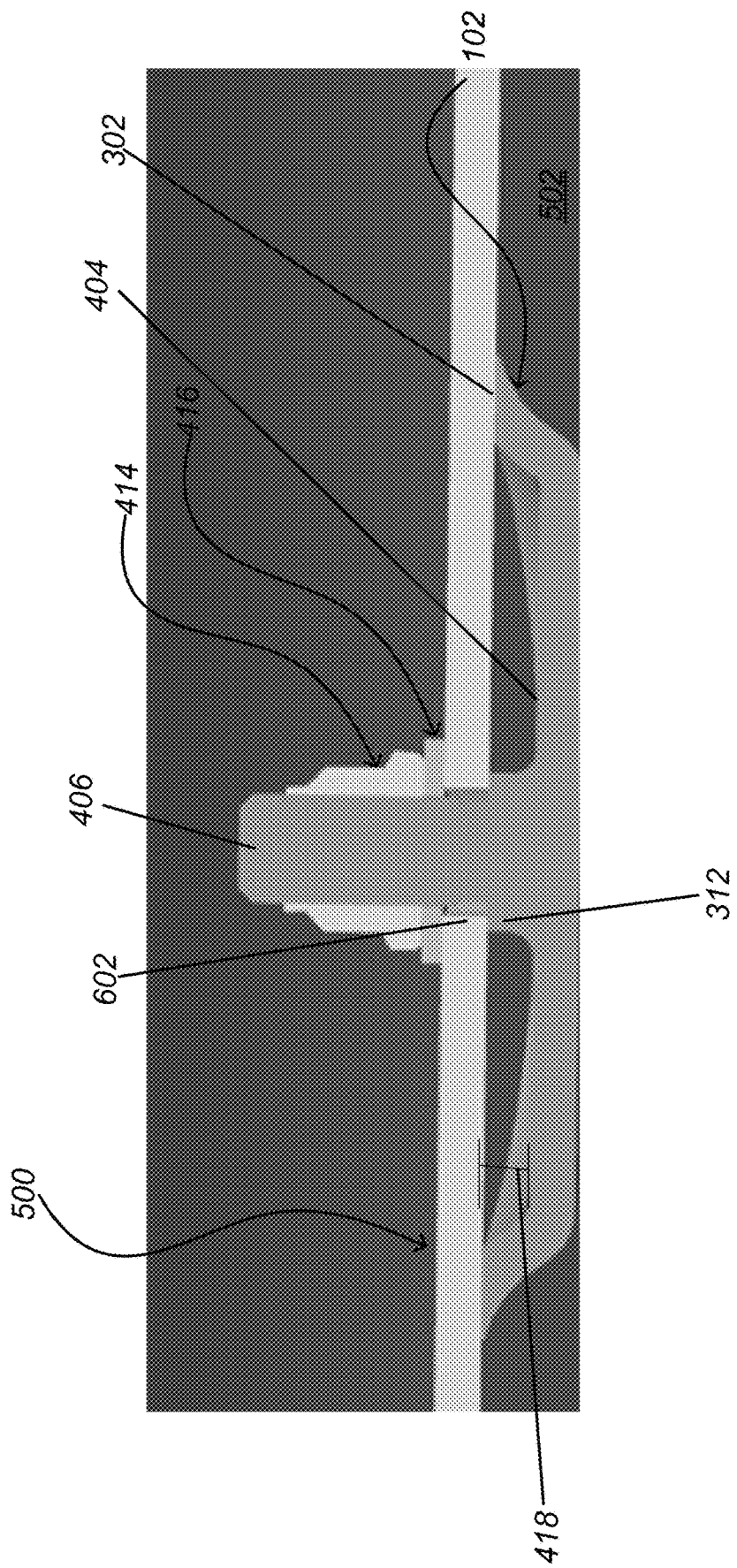
FIG. 5 illustrates an alternate circumferential cross-sectional view of an example of an outer single-walled combustion liner through an associated stud hole, with an example of a cartridge attached to the outer single-walled combustion liner.

FIG. 5 illustrates an alternate circumferential cross-sectional view of an example of an outer single-walled combustion liner 500 with an example of a cartridge 102 attached to the inner surface 502 of the outer single-walled combustion liner 500. The inner surface 502 of the outer single-walled combustion liner 500 faces a combustion chamber of an annular combustor. The circumferential cross-section is through an associated stud hole 602 in the outer single-walled combustion liner 500, a stud 406 of the attached cartridge 102, the nut 414, and a washer 416, rather than through an associated feed hole (not shown in FIG. 5). The cartridge 102 is attached to the outer single-walled combustion liner 500 at the inner surface 502 of the outer single-walled combustion liner 500, and at an associated feed hole (not shown in FIG. 5) in the outer single-walled combustion liner 500. The cartridge perimeter 302 contacts the inner surface 502 of the outer single-walled combustion liner 500. The cartridge surface 404 may have a cartridge bevel 316 establishing a web between the cartridge surface 404 and the cartridge perimeter 302. The attachment of the cartridge 102 to the outer single-walled combustion liner 500, or an inner single-walled combustion liner (not shown in FIG. 5) will provide a gap 418 by virtue of the radial inset of the cartridge surface 404 relative to the cartridge perimeter 302. The gap 418 may provide a source of air for effusion cooling of the attached cartridge 102. While not shown in FIG. 4, effusion cooling holes in the cartridge surface 404 and/or the cartridge bevel 316 may be adequately supplied by air filling the gap 418. A cartridge 300 includes at least two studs 406 integral to the cartridge 102 projecting radially outward, each of the at least two studs 406 extending through an associated stud hole 602 in the outer single-walled combustion liner 500, or an inner single-walled combustion liner. The cartridge 102 may include at least two studs 406. Alternatively, the cartridge 102 may include three or more studs 406, each extending through an associated stud hole 602 in the outer single-walled combustion liner 500, or an inner single-walled combustion liner. One associated stud hole 602 in a single-walled combustion liner may be a close-tolerance round associated stud hole, while a second associated stud hole 602 may optionally be slotted and/or oval to provide for clearance during assembly, and thermal growth. Each of the at least two studs 406 integral to the cartridge 102 may include a spacing feature 312 at the base of each of the at least two studs 406. To retain the attached cartridge 102 in the outer single-walled combustion liner 500, or an inner single-walled combustion liner, each of the at least two studs 406 of the attached cartridge 102 may project radially outward through an associated stud hole 602 and may be secured by the nut 414. A washer 416 (shown in FIG. 5), may be sandwiched between the outer surface of the outer single-walled combustion liner 500 and the nut 414. A washer 416 may be round where an associated stud hole is round, and a washer 416 may be oval where an associated stud hole is oval.

Figure 6:
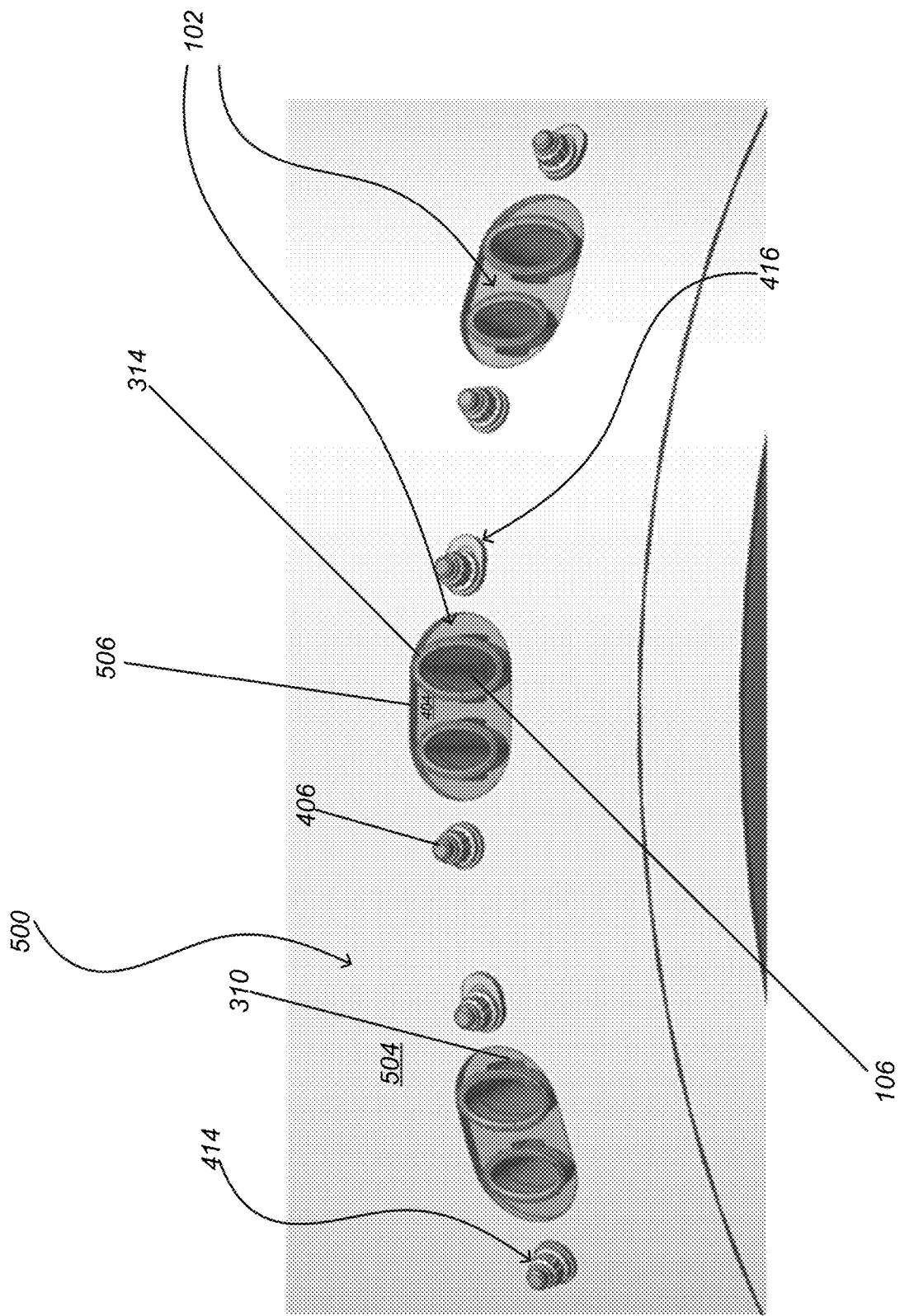
FIG. 6 illustrates a partial top view of an example of an outer single-walled combustion liner with an example of cartridges attached to the outer single-walled combustion liner.

FIG. 6 illustrates a partial top view of an example of an outer single-walled combustion liner 500 with an example of cartridges 102 attached to the outer single-walled combustion liner 500. Each of the cartridges 102 is attached to the outer single-walled combustion liner 500 from an inner surface (not shown in FIG. 6) of the outer single-walled combustion liner 500, relative to a combustion chamber. The inner surface (not shown in FIG. 6) of the outer single-walled combustion liner 500 faces the combustion chamber of an annular combustor. Each of the cartridges 102 may be attached to the outer single-walled combustion liner 500 at an associated feed hole 506 in the outer single-walled combustion liner 500. At least one bell-mouth inlet(s) 314 of each of the cartridges 102 may project radially outward from the cartridge surface 404 to a radial height outward of the outer surface 504 of the outer single-walled combustion liner 500, relative to the combustion chamber, or, alternatively, to a radial height flush with the outer surface 504, relative to the combustion chamber, or, alternatively to a radial height inward of the outer surface 504 of the outer single-walled combustion liner 500, relative to the combustion chamber. When each cartridge 102 is attached to an inner surface of an inner single-walled combustion liner (not shown in FIG. 6), the at least one bell-mouth inlet(s) 314 may project radially outward from the cartridge surface 404 to a radial height outward of the outer surface of the inner single-walled combustion liner, relative to the combustion chamber, or, alternatively, to a radial height flush with the outer surface of the inner single-walled combustion liner, relative to the combustion chamber, or, alternatively, to a radial height inward of the outer surface of the inner single-walled combustion liner, relative to the combustion chamber. The inner surface of an inner single-walled combustion liner (not shown in FIG. 6) faces the combustion chamber of the annular combustor. It will be appreciated that the outer single-walled combustion liner 500, or an inner single walled combustion liner (not shown in FIG. 6), an axial forward-aft physical dimension of an inner edge of each of the associated feed holes 506 in the outer single-walled combustion liner 500, or an inner single-walled combustion liner, may be the same as an axial forward-aft or physical dimension of an inner edge of the cartridge perimeter (not shown in FIG. 6) of the attached cartridges 102, while a circumferential physical dimension of the inner edge of each of the associated feed holes 506 in the outer single-walled combustion liner 500, or an inner single-walled combustion liner, is less than the circumferential physical dimension of the inner edge of the cartridge perimeter of the attached cartridges 102. Alternatively, the circumferential physical dimension of the inner edge of each of the associated feed holes 506 in the outer single-walled combustion liner 500, or an inner single-walled combustion liner (not shown in FIG. 6), may be the same as the circumferential physical dimension of the inner edge of the cartridge perimeter (not shown in FIG. 6) of the attached cartridges 102, while the axial forward-aft physical dimension of the inner edge of each of the associated feed holes 506 in the outer single-walled combustion liner 500, or an inner single-walled combustion liner, is less than the axial forward-aft physical dimension of the inner edge of the cartridge perimeter of the attached cartridges 102. Alternatively, the axial forward-aft and circumferential physical dimensions of the inner edge of each of the associated feed holes 506 may both be less than the respective axial forward-aft and circumferential physical dimensions of the inner edge of the cartridge perimeter of the attached cartridges 102. The axial forward-aft and circumferential physical dimensions of each of the associated feed holes 506 must be larger than the portion of the cartridge surface 404 including the at least one bell-mouth inlet(s) 314. Each of the at least one bell-mouth inlet(s) 314 has the same perimeter as the corresponding at least one chute 106 at which the at least one bell-mouth inlet 314 projects radially outward. The cartridge surface 404 may include crescent-shaped ("banana") slots 310 in the cartridge surface 404 through the thickness of the cartridge 102 around the periphery of each of the at least one chute(s) 106 and at least one bell-mouth inlet(s) 314. Each of the cartridges 102 includes at least two studs 406 integral to each of the cartridges 102 projecting radially outward, each of the at least two studs 406 extending through an associated stud hole (not shown in FIG. 6) in the outer single-walled combustion liner 500. As shown in the example in FIG. 6, each of the cartridges 102 may include two at least two studs 406. Alternatively, a cartridge 102 may include three or more studs 406, each extending through an associated stud hole (not shown in FIG. 6) in the outer single-walled combustion liner 500. One stud hole in a single-walled combustion liner may be a close-tolerance round stud hole, while a second stud hole may optionally be slotted to provide for clearance during assembly, and thermal growth. Each of the cartridges 102 includes at least one chute 106 integral to the cartridge 102 projecting radially inward. To retain each of the attached cartridges 102 in the outer single-walled combustion liner 500, or an inner single-walled combustion liner (not shown in FIG. 6), each of the at least two studs 406 of the attached cartridge 102 projects radially outward through an associated stud hole and is secured by a nut 414. A washer 416 may be sandwiched between the outer surface 504 of the outer single-walled combustion liner 500 and the nut 414. Each of the cartridges 102 may be attached to the outer single-walled combustion liner 500, or an inner single-walled combustion liner, or both, along a circumferential axis, an axial forward-aft axis, or along a path on an acute angle offset from the circumferential and axial forward-aft axes. As shown in the example in FIG. 6, each of the cartridges 102 is attached to the outer single-walled combustion liner 500 along a common circumferential axis. A cartridge 102 may be elongated, and/or may include more than two at least one studs 406, and/or more than one at least one bell-mouth inlet(s) 314 and more than one at least one chute 106, and may span two or more associated feed holes 506. Alternatively, a cartridge 102 may be elongated and may include more than one at least one bell-mouth inlet 314 and more than one chute 106 and span two or more associated feed holes 506, but include only two at least two studs 406, projecting radially outward from opposite ends of the cartridge surface 404, such that each of the associated feed holes 506 may have only one adjacent associated stud hole (not shown in FIG. 6). The cartridge surface 404 of each of the cartridges 102 is bounded by a cartridge perimeter (not shown in FIG. 6). Each of the cartridges 102 may have a cartridge perimeter that is round, oval, elliptical, or stadium in shape.

Figure 7:
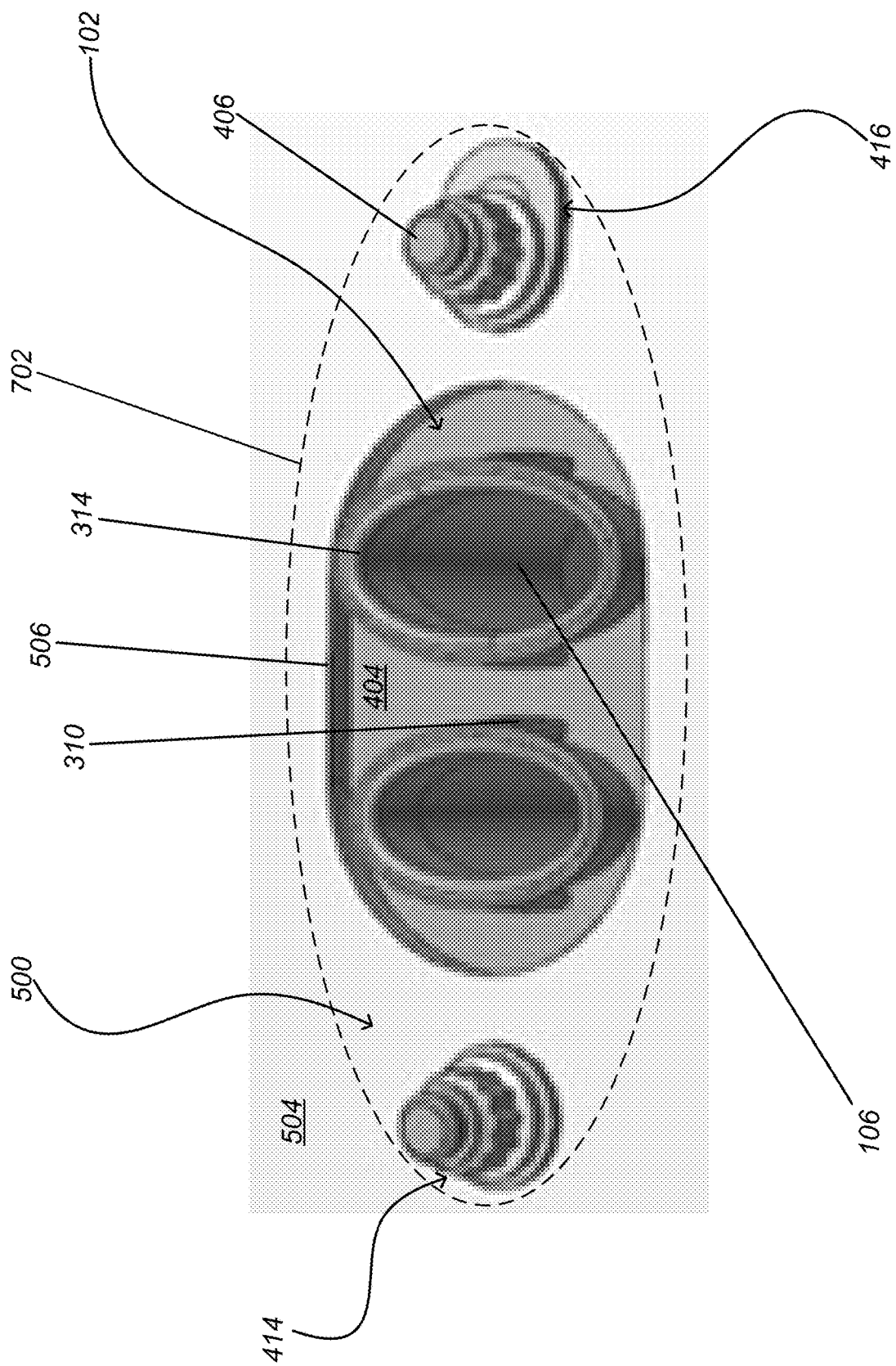
FIG. 7 illustrates an enlarged partial top view of an example of an outer single-walled combustion liner with an example of a cartridge attached to the outer single-walled combustion liner.

FIG. 7 illustrates an enlarged partial top view of an example of an outer single-walled combustion liner 500 with an example of a cartridge 102 attached to the outer single-walled combustion liner 500. The cartridge 102 is attached to the outer single-walled combustion liner 500 from an inner surface (not shown in FIG. 7) of the outer single-walled combustion liner 500, relative to a combustion chamber. The inner surface (not shown in FIG. 7) of the outer single-walled combustion liner 500 faces the combustion chamber of an annular combustor. The cartridge 102 may be attached the outer single-walled combustion liner 500 at an associated feed hole 506 in the outer single-walled combustion liner 500 such that a cartridge perimeter (not shown in FIG. 7) contacts the outer single-walled combustion liner 500 on the inner surface of the outer single-walled combustion liner 500. The cartridge perimeter may have an elliptical shape. Preferably, the cartridge perimeter may have a shape similar if not congruent to the associated feed hole 506. An outline 702 of the cartridge perimeter as it may contact the inner surface of the outer single-walled combustion liner 500 is shown in FIG. 7, though the cartridge perimeter is blocked from view due to the associated feed hole 506 of the outer single-walled combustion liner 500. At least one bell-mouth inlet(s) 314 of the cartridge may project radially outward from the cartridge surface 404 to a radial height outward of the outer surface 504 of the outer single-walled combustion liner 500, relative to the combustion chamber, or, alternatively, to a radial height flush with the other surface 504, relative to the combustion chamber, or, alternatively, to a radial height inward of the outer surface 504 of the outer single-walled combustion liner 500, relative to the combustion chamber. Each of the at least one bell-mouth inlet(s) 314 has the same perimeter as the corresponding at least one chute(s) 106 at which the at least one bell-mouth inlet(s) 314 projects radially outward. The cartridge surface 404 may include crescent-shaped ("banana") slots 310 in the cartridge surface 404 through the thickness of the cartridge 102 around the periphery of each of the at least one chute(s) 106 and at least one bell-mouth inlet(s) 314. The cartridge may have effusion cooling holes (not shown in FIG. 7) in the cartridge surface 404. The cartridge 102 includes at least two studs 406 integral to the cartridge 102 projecting radially outward, each of the at least two studs 406 extending through an associated stud hole (not shown in FIG. 7) in the outer single-walled combustion liner 500. To retain the attached cartridge 102 in the outer single-walled combustion liner 500, each of the at least two studs 406 of the attached cartridge 102 projects radially outward through an associated stud hole and is secured by a nut 414. A washer 416 may be sandwiched between the outer surface 504 of the outer single-walled combustion liner 500 and the nut 414.

Figure 8:
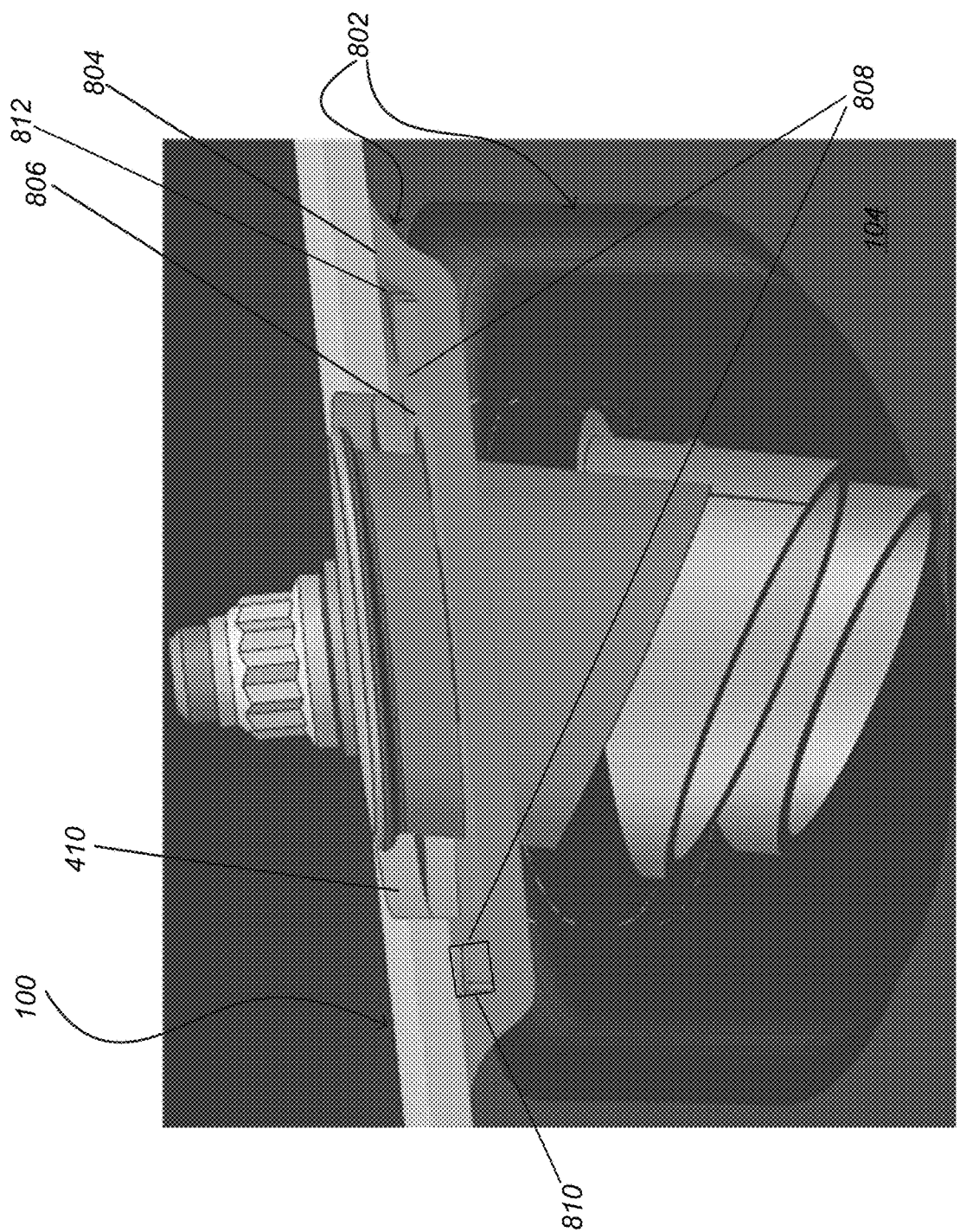
FIG. 8 illustrates a circumferential cross-sectional view of an example of the outer single-walled combustion liner with yet another example of cartridges attached to the outer single-walled combustion liner.

FIG. 8 illustrates a circumferential cross-sectional view of an example of the outer single-walled combustion liner 100 with yet another example of cartridges 802 attached to the outer single-walled combustion liner 100. Each of the cartridges 802 is attached to the outer single-walled combustion liner 100 from an inner surface 104 of the outer single-walled combustion liner 100, relative to a combustion chamber. The inner surface 104 of the outer single-walled combustion liner 100 faces the combustion chamber of the annular combustor. Each of the cartridges 802 includes a cartridge surface 806 bordered by a cartridge perimeter 804. Each of the cartridges 802 may have a cartridge perimeter 804 that is round, oval, elliptical, or stadium in shape. The cartridge surface 806 may have a cartridge bevel 812 establishing a web between the cartridge surface 806 and the cartridge perimeter 804. As shown in the example in FIG. 8, the cartridge surface 806 may be inset radially compared to the cartridge perimeter 804 by the cartridge bevel 812. The cartridge surface 806 may be inset radially compared to the cartridge perimeter 804 by approximately one single walled combustion liner thickness, or, alternatively, the cartridge surface 806 may be inset radially compared to the cartridge perimeter 804 by more than one single-walled combustion liner thickness, or, alternatively, by less than one single-walled combustion liner thickness. Each of the cartridges 802 includes an air dam feature 808 protruding radially outward from the cartridge surface 806 to a height equal to the radial inset of the cartridge surface 806 relative to the cartridge perimeter 804. The air dam feature 808 may be continuous and may correspond to the shape as each of the associated feed holes 410 at which each of the cartridges 802 is attached to the inner surface 104 of the outer single-walled combustion liner 100. The air dam feature 808 may be flush with each of the associated feed holes 410 as shown in FIG. 8. A volume 810 may be defined by the air dam feature 808, the cartridge surface 806, the cartridge bevel 812, and the inner surface 104 of the outer single-walled combustion liner 100. The volume 810 may function as an air dam, which may provide for an effusion cooling technique that may be more practical or advantageous in some technology applications. The area of effusion cooling holes (not shown in FIG. 8) in the cartridge surface 806 and/or the cartridge bevel 812 may be 2× (i.e., twice) the area of each of the associated feed holes 410 in the outer single-walled combustion liner 100 subtending the cartridge surface 806 of each of the attached cartridges 802, or, alternatively, the area of the effusion cooling holes (not shown in FIG. 8) in the cartridge surface 806 and/or the cartridge bevel 812 may be less than 2× (i.e., twice) the area of each of the associated feed holes 410 in the outer single-walled combustion liner 100 subtending the cartridge surface 806 of each of the attached cartridges 802, or, alternatively, the area of the effusion cooling holes (not shown in FIG. 8) in the cartridge surface 806 and/or the cartridge bevel 812 may be more than 2× (i.e., twice) the area of each of the associated feed holes 410 in the outer single-walled combustion liner 500 subtending the cartridge surface 806 of each of the attached cartridges 802.

Figure 9:
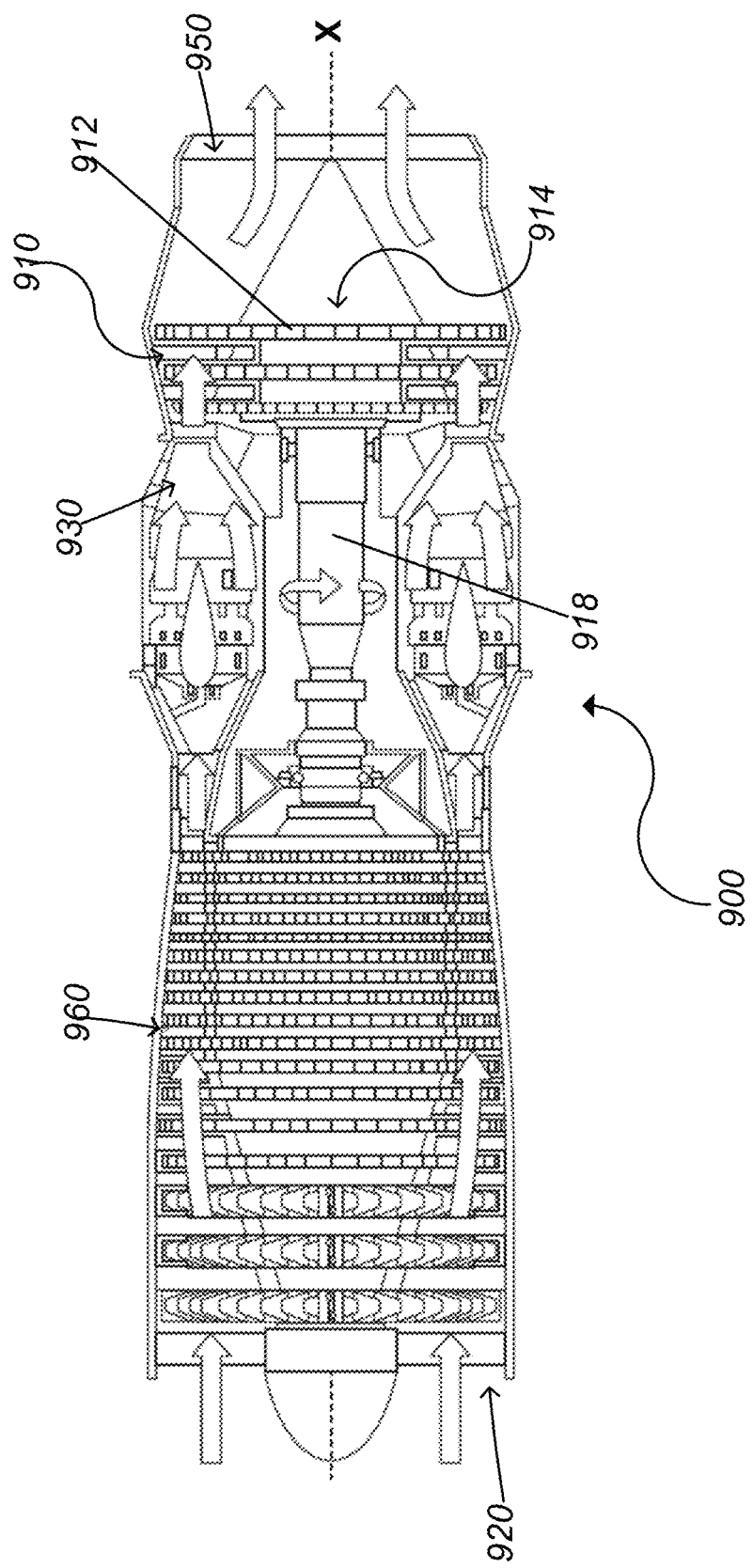
FIG. 9 illustrates a cross-sectional view of an example of a gas turbine engine.

FIG. 9 illustrates a cross-sectional view of an example of a gas turbine engine 900. In some examples, the gas turbine engine 900 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, the gas turbine engine 900 may be utilized in a configuration unrelated to an aircraft such as, for example, an industrial application, an energy application, a power plant, a pumping set, a marine application (for example, for naval propulsion), a weapon system, a security system, a perimeter defense or security system. As described herein, the gas turbine engine 900 may operate with a convertible configuration in either a turbofan mode or a turboshaft mode. The gas turbine engine 900 may take a variety of forms in various examples. Though depicted as an axial flow engine, in some examples, the gas turbine engine 900 may have multiple spools and/or may be a centrifugal or mixed centrifugal/axial flow engine. In some examples, the gas turbine engine 900 may be a turbojet or turboprop engine with a convertible configuration. Furthermore, the gas turbine engine 900 may be an adaptive cycle and/or variable cycle engine. Other variations are also contemplated. The gas turbine engine 900 may include an intake section 920, a compressor section 960, a combustion section 930, a turbine section 910, and an exhaust section 950. As noted above, the hot, high pressure fluid passes through the turbine section 910 during operation of the gas turbine engine 900. As the fluid flows through the turbine section 910, the fluid passes between adjacent blades 912 of the turbine 914 causing the turbine 914 to rotate. The rotating turbine 914 may turn the shaft 918 such that the blades 912 may rotate around an axis of rotation, such as a centerline X of the turbine 914. In examples, such as the example illustrated in FIG. 9, the centerline X of the turbine 914 and the centerline of the gas turbine engine 900 are the same.

In some examples of the present disclosure, only one cartridge may be applied to a single-walled combustion liner at one, two, or three or more associated feed holes. In other examples of the present disclosure, two or more cartridges may be applied to a single-walled combustion liner at two or more respective associated feed holes. In further examples of the present disclosure, each cartridge may be applied to a single-walled combustion liner at one, two, or three or more associated feed holes so as to provide at least one chute(s) at one or more desirable positions of the single-walled combustion liner. In still further examples of the present disclosure, cartridges may not be applied to a single-walled combustion liner along an entirety of one or more circumferential or forward-aft axes of the single-walled combustion liner.

A combustion liner according to the examples of the present disclosure may be single-walled. The term "single-walled," as used herein, unless stated otherwise, alone or in combination with other terms, refers to a composition of a liner defining a combustion chamber, wherein combustion ensues, such that the combustion chamber may be defined by a one-piece casting construction single layer of outer liner material and a one-piece casting construction single layer of inner liner material, for example, in the shape of an annulus, wherein the combustion liner may have a hot side and a cold side. The term "single-walled" may be differentiated from other examples of a combustion liner wall, including, but not limited to, a liner including a pair of spaced walls, with cooling channels formed therein wherein the cooling channels may be arranged longitudinally in a circumferentially spaced array, and the cooling channels may be machined to include arrays of concavities that may be closely spaced together, but may vary in spacing.

Each cartridge may include additional or fewer components. Each cartridge may be attached to an inner surface of an outer single-walled combustion liner or to an inner surface of an inner single-walled combustion liner. For example, each cartridge may include a singlet, doublet, a triplet, a quadruplet, a quintuplet, or higher multiples of bell-mouth inlets and chutes. Each cartridge may have multiple singlets, doublets, triplets, quadruplets, quintuplets, or higher multiplets of bell-mouth inlets and chutes. Each cartridge may include one, two, three, four, five, or higher numbers of studs. Each cartridge may have a cartridge perimeter that is round, oval, elliptical, or stadium in shape. Each cartridge may be attached to a single-walled combustion liner along a circumferential axis, an axial forward-aft axis, or along a path on an acute angle offset from the circumferential and axial forward-aft axes. Each cartridge may span one or more than one associated feed hole in a single-walled combustion liner, or may be so elongated that each cartridge merges into one another in a "wasp-waist" phenomenon. Each cartridge may include crescent-shaped ("banana") slots in the cartridge surface, and/or effusion cooling holes in the cartridge surface and/or cartridge perimeter. The cartridge surface of a cartridge may be inset radially from the cartridge perimeter to the same radial height as the radial thickness of a single-walled combustion liner to which the cartridge is to be attached, or alternatively, to a larger radial height, or alternatively, to a smaller radial height, than the radial thickness of a single-walled combustion liner to which the cartridge is to be attached. Each cartridge may have a radial thickness substantially the same as the radial thickness of the single-walled combustion liner to which the cartridge is to be attached, or, alternatively, each cartridge may be radially thicker, or, alternatively, each cartridge may be radially thinner, than the radial thickness of the single-walled combustion liner to which the cartridge is to be attached.

In the above descriptions of the present disclosure, a cartridge may be applied equally and without limitation, to an outer single-walled combustion liner or an inner single-walled combustion liner. The referents "inner," "outer," "inward," "outward," "inwardly," and "outwardly," as used herein, unless stated otherwise, alone or in combination with other terms, refer to directions relative to a combustion chamber of an annular combustor.

In the context of the present disclosure, a first piece is said to be integral to a second piece if the first and second pieces are formed as a single piece. For example, if the first and second pieces are cast as a single metal or metal alloy piece, then the first piece is integral to the second piece.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more." Unless otherwise indicated or the context suggests otherwise, as used herein, "plurality of" is defined by the Applicant in the broadest sense, superseding any other implied definitions or limitations hereinbefore or hereinafter unless expressly asserted by the Applicant to the contrary, to mean a quantity of more than one. Unless otherwise indicated or the context suggests otherwise, as used herein, "each" is defined by the Applicant in the broadest sense, superseding any other implied definitions or limitations hereinbefore or hereinafter unless expressly asserted by the Applicant to the contrary, to refer to every one element of a group including two or more elements or that may include two or more elements.

All methods described herein can be performed in any suitable order unless otherwise indicated herein or otherwise clearly contradicted by context.

While various examples have been described, it will be apparent to those of ordinary skill in the art that many more examples and implementations are possible. Accordingly, the examples described herein are not the only possible implementations.

The subject-matter of the disclosure may also relate, among others, to the following aspects:

A first aspect relates to a cartridge comprising: a cartridge surface; a cartridge perimeter bordering the cartridge surface; at least one chute integral to the cartridge; at least two studs integral to the cartridge; and wherein the cartridge is attached on an inner surface of a single-walled combustion liner of an annular combustor of a gas turbine engine and spans across an associated feed hole in the single-walled combustion liner; wherein the inner surface of the single-walled combustion liner faces a combustion chamber of the annular combustor; and wherein the cartridge perimeter contacts the inner surface of the single-walled combustion liner.

A second aspect relates to the cartridge of aspect 1, wherein the at least one chute projects into the combustion chamber of the annular combustor.

A third aspect relates to the cartridge of aspect 1, wherein each of the at least two studs projects through an associated stud hole in the single-walled combustion liner.

A fourth aspect relates to the cartridge of aspect 1, wherein the cartridge further comprises a corresponding bell-mouth inlet for each respective one of the at least one chute, the corresponding bell-mouth inlet integral to the cartridge, wherein the corresponding bell-mouth inlet projects from the cartridge surface at each respective one of the at least one chute through the associated feed hole, wherein the corresponding bell-mouth inlet comprises a perimeter equal to, and comprises a cross-sectional shape identical to, that of each respective one of the at least one chute.

A fifth aspect relates to the cartridge of aspect 4, wherein the corresponding bell-mouth inlet for each respective one of the at least one chute comprises a cross-sectional shape selected from the group consisting of round, oval, elliptical, and quasi-elliptical.

A sixth aspect relates to the cartridge of aspect 4, further comprising a plurality of holes in the cartridge surface, wherein the plurality of holes comprise crescent-shaped holes bordering each of the at least one chute.

A seventh aspect relates to the cartridge of aspect 1, further comprising a plurality of holes in the cartridge surface.

An eight aspect relates to the cartridge of any preceding aspect, wherein the cartridge perimeter has a shape selected from the group consisting of a circle, an oval, an ellipsis, a quasi-ellipsis, and a stadium.

A ninth aspect relates to the cartridge of any preceding aspect, wherein the cartridge is retained in the single-walled combustion liner by a nut on each of the at least two studs.

A tenth aspect relates to the cartridge of aspect 1, wherein the cartridge perimeter is larger than the associated feed hole in the single-walled combustion liner, and wherein a portion of the inner surface of the single-walled combustion liner is within the cartridge perimeter.

An eleventh aspect relates to the cartridge of aspect 1, wherein an inner edge of the cartridge perimeter has a physical dimension equal to a physical dimension of an inner edge of the associated feed hole in the single-walled combustion liner.

A twelfth aspect relates to the cartridge of aspect 1, wherein the cartridge extends circumferentially along the inner surface of the single-walled combustion liner.

A thirteenth aspect relates to the cartridge of aspect 1, wherein the cartridge is arranged axially along the inner surface of the single-walled combustion liner.

A fourteenth aspect relates to the cartridge of aspect 1, wherein the cartridge is arranged along the inner surface of the single-walled combustion liner on an acute angle offset from each of a circumferential axis and an axial forward-aft axis.

A fifteenth aspect relates to the cartridge of aspect 1, wherein the single-walled combustion liner is an outer single-walled combustion liner.

A sixteenth aspect relates to the cartridge of aspect 1, wherein the single-walled combustion liner is an inner single-walled combustion liner.

A seventeenth aspect relates to the cartridge of aspect 1, wherein the cartridge spans across two or more associated feed holes.

An eighteenth aspect relates to the cartridge of aspect 17, further comprising a bell-mouth inlet for each respective one of the at least one chute, the bell-mouth inlet integral to the cartridge, wherein the bell-mouth inlet projects radially outward from the cartridge surface at each respective one of the at least one chute through each of the two or more associated feed holes, wherein the bell-mouth inlet comprises a perimeter equal to, and comprises a cross-sectional shape identical to, that of each respective one of the at least one chute.

A nineteenth aspect relates to a cartridge comprising: a cartridge surface; a cartridge bevel bordering the cartridge surface; a cartridge perimeter bordering the cartridge bevel; at least one chute integral to the cartridge; at least two studs integral to the cartridge; and wherein the cartridge is attached on an inner surface of a single-walled combustion liner of an annular combustor of a gas turbine engine and spans across an associated feed hole in the single-walled combustion liner; wherein the inner surface of the single-walled combustion liner faces a combustion chamber of the annular combustor; wherein the cartridge perimeter contacts the inner surface of the single-walled combustion liner; and wherein the cartridge surface does not contact the inner surface of the single-walled combustion liner such that a gap is between the inner surface of the single-walled combustion liner and the cartridge surface.

A twentieth aspect relates to a method of attaching a cartridge to a combustion liner of an annular combustor of a gas turbine engine, the method comprising: providing a cartridge, comprising: a cartridge surface; a cartridge perimeter bordering the cartridge surface; at least one chute integral to the cartridge; and at least two studs integral to the cartridge; contacting the cartridge perimeter with an inner surface of the combustion liner, wherein the inner surface faces a combustion chamber of the annular combustor, and wherein each of the at least two studs projects through an associated stud hole in the single-walled combustion liner; and fastening a nut on each of the at least two studs so as to retain the cartridge in the combustion liner; wherein the combustion liner is a single-walled combustion liner.

In addition to the features mentioned in each of the independent aspects enumerated above, some examples may show, alone or in combination, the optional features mentioned in the dependent aspects and/or as disclosed in the description above and shown in the figures.

What is claimed is:
1. A cartridge, comprising:
a cartridge surface;
a cartridge bevel bordering the cartridge surface;
a cartridge perimeter bordering the cartridge bevel;
at least one chute integral to the cartridge;
at least two studs integral to the cartridge; and
a plurality of holes through the cartridge surface, the plurality of holes within the cartridge perimeter, the plurality of holes having a combined principal orifice area, each hole of the plurality of holes having a peripheral edge that surrounds the hole and is defined by the cartridge surface,
wherein the cartridge is attached on an inner surface of a single-walled combustion liner of an annular combustor of a gas turbine engine and the cartridge spans across an associated feed hole in the single-walled combustion liner;

wherein the inner surface of the single-walled combustion liner faces a combustion chamber of the annular combustor;

wherein the cartridge perimeter contacts the inner surface of the single-walled combustion liner;

wherein the cartridge perimeter is larger than the associated feed hole in the single-walled combustion liner;

wherein the cartridge surface does not contact the inner surface of the single-walled combustion liner such that a radial gap is between the inner surface of the single-walled combustion liner and the cartridge surface, the associated feed hole extending over a subtended feed area of the cartridge surface; and wherein the subtended feed area is greater than the combined principal orifice area.

2. The cartridge of claim 1, wherein the at least one chute projects into the combustion chamber of the annular combustor.

3. The cartridge of claim 1, wherein each of the at least two studs projects through an associated stud hole in the single-walled combustion liner.

4. The cartridge of claim 1, further comprising a corresponding bell-mouth inlet for each respective one of the at least one chute, the corresponding bell-mouth inlet integral to the cartridge, wherein the corresponding bell-mouth inlet projects from the cartridge surface at each respective one of the at least one chute through the associated feed hole, wherein the corresponding bell-mouth inlet comprises a perimeter equal to, and comprises a cross-sectional shape identical to, that of each respective one of the at least one chute.

5. The cartridge of claim 4, wherein the corresponding bell-mouth inlet for each respective one of the at least one chute comprises the cross-sectional shape selected from the group consisting of a round, an oval, an elliptical, and a quasi-elliptical.

6. The cartridge of claim 4, wherein the plurality of holes comprise crescent-shaped holes bordering each of the at least one chute.

7. The cartridge of claim 1, wherein the cartridge perimeter has a shape selected from the group consisting of a circle, an oval, an ellipsis, a quasi-ellipsis, and a stadium.

8. The cartridge of claim 1, wherein the cartridge extends circumferentially along the inner surface of the single-walled combustion liner.

9. The cartridge of claim 1, wherein the cartridge is arranged axially along the inner surface of the single-walled combustion liner.

10. The cartridge of claim 1, wherein the cartridge is arranged along the inner surface of the single-walled combustion liner on an acute angle offset from each of a circumferential axis and an axial forward-aft axis.

11. The cartridge of claim 1, wherein the single-walled combustion liner is an outer single-walled combustion liner.

12. The cartridge of claim 1, wherein the single-walled combustion liner is an inner single-walled combustion liner.

13. The cartridge of claim 1, wherein the cartridge is retained in the single-walled combustion liner by a nut on each of the at least two studs.

14. The cartridge of claim 1, wherein the cartridge spans across two or more associated feed holes.

15. The cartridge of claim 14, further comprising a bell-mouth inlet for each respective one of the at least one chute, the bell-mouth inlet integral to the cartridge, wherein the bell-mouth inlet projects radially outward from the cartridge surface at each respective one of the at least one chute through each of the two or more associated feed holes, wherein the bell-mouth inlet comprises a perimeter equal to, and comprises a cross-sectional shape identical to, that of each respective one of the at least one chute.

16. A cartridge, comprising:
a cartridge surface;
a cartridge bevel bordering the cartridge surface;
a cartridge perimeter bordering the cartridge bevel;
at least one chute integral to the cartridge;
at least two studs integral to the cartridge; and
a plurality of holes in the cartridge surface, the plurality of holes having a combined principal orifice area; and
wherein the cartridge is attached on an inner surface of a single-walled combustion liner of an annular combustor of a gas turbine engine and spans across an associated feed hole in the single-walled combustion liner;
wherein the inner surface of the single-walled combustion liner faces a combustion chamber of the annular combustor;
wherein the cartridge perimeter contacts the inner surface of the single-walled combustion liner;
wherein the cartridge perimeter is larger than the associated feed hole in the single-walled combustion liner;
wherein the cartridge surface does not contact the inner surface of the single-walled combustion liner such that a radial gap is between the inner surface of the single-walled combustion liner and the cartridge surface, the associated feed hole extending over a subtended feed area of the cartridge surface; and
wherein the subtended feed area is at least four times greater than the combined principal orifice area.

17. A method of attaching a cartridge to a combustion liner of an annular combustor of a gas turbine engine, the method comprising:
providing a cartridge, comprising:
a cartridge surface;
a cartridge bevel bordering the cartridge surface;
a cartridge perimeter bordering the cartridge bevel;
at least one chute integral to the cartridge;
at least two studs integral to the cartridge; and
a plurality of holes through the cartridge surface, the plurality of holes within the cartridge perimeter, the plurality of holes having a combined principal orifice area, each hole of the plurality of holes having a peripheral edge that surrounds the hole and is defined by the cartridge surface;
contacting the cartridge perimeter with an inner surface of the combustion liner, wherein the inner surface faces a combustion chamber of the annular combustor and does not contact the cartridge surface, wherein each of the at least two studs projects through an associated stud hole in the combustion liner, wherein the cartridge perimeter is larger than an associated feed hole in the combustion liner and the cartridge spans across the associated feed hole, and wherein the associated feed hole extends over a subtended feed area of the cartridge surface; and
fastening a nut on each of the at least two studs so as to retain the cartridge in the combustion liner;
wherein the combustion liner is a single-walled combustion liner; and
wherein the subtended feed area is greater than the combined principal orifice area.

* * * * *